United States Patent
Sambonsuge

(10) Patent No.: US 12,409,736 B2
(45) Date of Patent: Sep. 9, 2025

(54) MOTOR CONTROL DEVICE USING TEMPERATURE DETERMINATION

(71) Applicant: Hitachi Astemo, Ltd., Hitachinaka (JP)

(72) Inventor: Hirokazu Sambonsuge, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 410 days.

(21) Appl. No.: 17/795,720

(22) PCT Filed: Dec. 15, 2020

(86) PCT No.: PCT/JP2020/046664
§ 371 (c)(1),
(2) Date: Jul. 27, 2022

(87) PCT Pub. No.: WO2021/153050
PCT Pub. Date: Aug. 5, 2021

(65) Prior Publication Data
US 2023/0068986 A1     Mar. 2, 2023

(30) Foreign Application Priority Data

Jan. 28, 2020  (JP) ................. 2020-011301

(51) Int. Cl.
*B60L 15/20* (2006.01)
*B60L 15/06* (2006.01)
(Continued)

(52) U.S. Cl.
CPC .............. *B60L 15/06* (2013.01); *H02P 27/08* (2013.01); *H02P 29/62* (2016.02); *B60L 2240/425* (2013.01)

(58) Field of Classification Search
CPC ............... B60L 15/06; B60L 2240/425; B60L 2240/423; B60L 2240/526; B60L 15/20;
(Continued)

(56) References Cited

U.S. PATENT DOCUMENTS

2009/0288634 A1* 11/2009 Takizawa ............... H02P 29/60
                                                                 123/349
2019/0115865 A1    4/2019 Inokuma et al.
(Continued)

FOREIGN PATENT DOCUMENTS

JP    2000-032602 A    1/2000
JP    2003-304604 A    10/2003
(Continued)

OTHER PUBLICATIONS

International Search Report with English Translation and Written Opinion in PCT/JP2020/046664 dated Mar. 23, 2021.

*Primary Examiner* — Daniel M. Robert
(74) *Attorney, Agent, or Firm* — Foley & Lardner LLP

(57) ABSTRACT

A position estimation system provided in a vehicle can include a front sensor, a peripheral sensor, a position estimation device, and a control device. The position estimation device can be configured to determine weights for each of a plurality of pieces of information related to a state and a surrounding environment of the vehicle, the plurality of pieces of information comprising vehicle speed, steering angle, traveling environment, predicted curvature, and surrounding environment. The position estimation device can then select whether to use a plurality of feature point groups including a part of the plurality of feature points detected by the front sensor and the peripheral sensor to estimate the position of the vehicle based on the weights.

6 Claims, 7 Drawing Sheets

(51) Int. Cl.
*H02P 27/08* (2006.01)
*H02P 29/62* (2016.01)

(58) Field of Classification Search
CPC .......... H02P 27/08; H02P 29/62; H02P 29/60;
H02P 25/03; H02P 2207/05; Y02T 10/64;
Y02T 10/72
See application file for complete search history.

(56) References Cited

U.S. PATENT DOCUMENTS

2020/0021220 A1    1/2020   Matsui et al.
2023/0068986 A1*   3/2023   Sambonsuge .......... B60L 15/20

FOREIGN PATENT DOCUMENTS

| | | |
|---|---|---|
| JP | 2018-102102 A | 6/2018 |
| WO | WO-2017/163609 A1 | 9/2017 |
| WO | WO-2018/142952 A1 | 8/2018 |

* cited by examiner

FIG. 3
(a)
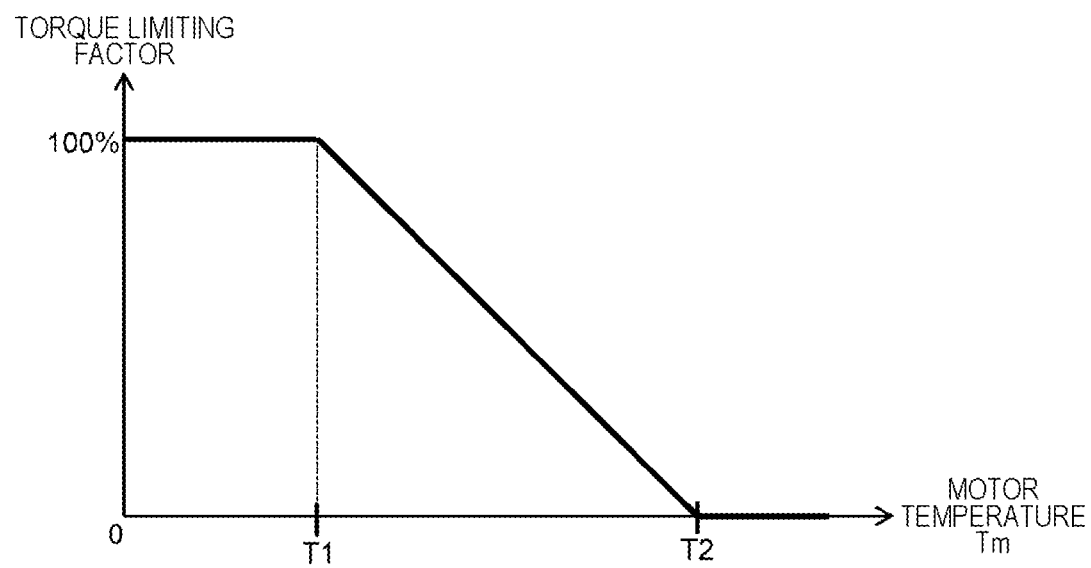
(b)
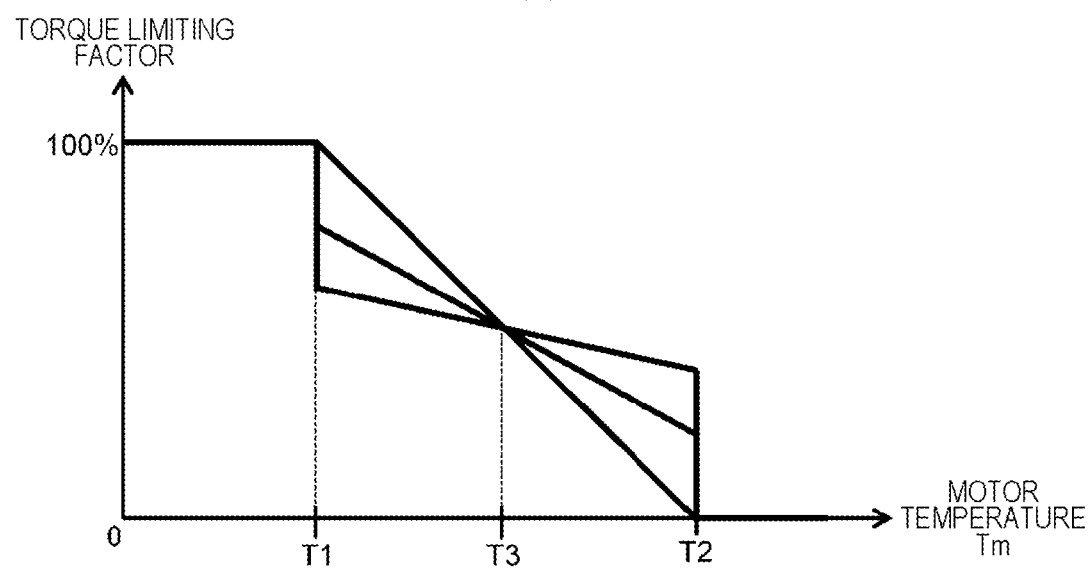

MOTOR CONTROL DEVICE USING TEMPERATURE DETERMINATION

TECHNICAL FIELD

The present invention relates to a control device.

BACKGROUND ART

Conventionally, an electric vehicle such as an electric car or a hybrid car, when an overload state of a motor continues due to high-speed traveling for a long time, climbing of a hill road, or the like, the temperature of the motor rises and becomes an overheated state, which may cause a failure. Therefore, there is a demand for techniques for limiting an output torque according to a state of the temperature of the motor.

As a background art of the present invention, the following patent literature is known. PTL 1 discloses a technique capable of more effectively suppressing heat generation of a motor during regenerative control by setting a temperature at which restriction of a motor output in regenerative control is started to be lower than a temperature of power running control. Further, PTL 2 discloses a technique capable of simultaneously achieving temperature protection and exhibition of performance of a motor by changing temperature limitation of the motor according to a predetermined standard of a change rate of a motor temperature.

CITATION LIST

Patent Literature

PTL 1: JP 2000-32602 A
PTL 2: JP 2003-304604 A

SUMMARY OF INVENTION

Technical Problem

In the technique of PTL 1, when a motor temperature at which torque limitation is started is lowered in order to suppress hunting due to a delay generated in the process of temperature detection, an output of the motor is likely to be limited, so that there is a problem that a high output time at the time of acceleration is shortened.

Further, in the technique of PTL 2, a method of changing a slope of the torque limitation map according to a temperature change is used, but an equilibrium point between the motor temperature and a limitation torque changes depending on a temperature increase before the start of the torque limitation, and a torque that can be continuously output decreases, so that there is a problem that it is difficult to sufficiently exhibit the performance of the motor.

Solution to Problem

A control device according to the present invention includes: a PWM generation unit that outputs a PWM drive signal to an inverter; and a torque limiting unit that outputs a post-limitation torque command to the PWM generation unit based on a torque command from a higher-order control unit and a motor temperature. The torque limiting unit includes a torque limiting factor calculation unit that calculates a torque limiting factor based on the motor temperature, and a post-limitation torque calculation unit that outputs the post-limitation torque command to the PWM generation unit based on the torque command from the higher-order control unit and the torque limiting factor output from the torque limiting factor calculation unit. The torque limiting factor calculation unit limits an output torque of a motor based on the motor temperature in a case where the motor temperature is higher than a predetermined temperature, and limits a torque to make the torque change more gently in a case where a rate of change over time in the motor temperature is larger than a predetermined value as compared with a case where the rate of change over time in the motor temperature is equal to or smaller than the predetermined value.

Advantageous Effects of Invention

According to the present invention, the output of the motor does not decrease more than necessary.

BRIEF DESCRIPTION OF DRAWINGS

FIG. 3 is a schematic diagram of a torque limiting factor map.

DESCRIPTION OF EMBODIMENTS

Hereinafter, embodiments of the present invention will be described with reference to the drawings.

Configuration of Control Device and First Embodiment

Figure 1:
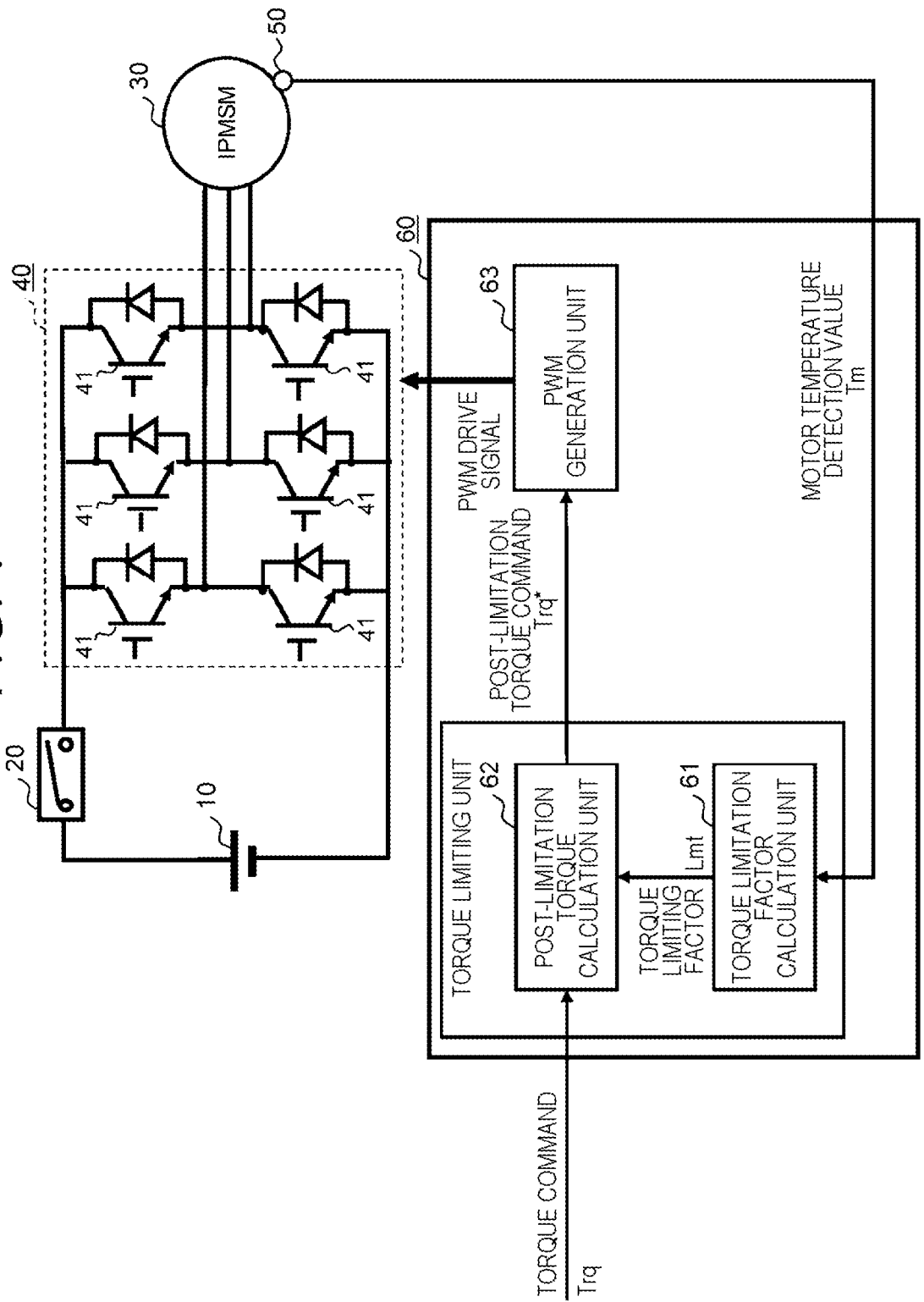
FIG. 1 is a diagram illustrating a configuration of a control device according to a first embodiment of the present invention.

A control device according to a first embodiment of the present invention will be described with reference to FIGS. 1 to 6. FIG. 1 is a diagram illustrating a configuration of a control device 60 according to the first embodiment of the present invention.

In a system method of the control device 60, a voltage of a DC power supply 10 is output to an inverter 40 via a contactor 20 to convert a DC voltage into an AC voltage, and the converted AC voltage is supplied to an AC motor 30 (IPMSM, hereinafter, the motor 30) to control the motor 30. For example, in a case where the DC power supply 10 is applied to a drive system of a hybrid car or the like, a secondary battery such as a nickel-metal hydride battery or a lithium ion battery is used. At that time, a voltage is assumed to be several hundred V, and an output shaft of the motor 30 is assumed to be connected to an axle.

Further, in the inverter 40, elements that perform switching at a high speed, such as IGBTs, are arranged for three phases on each of a positive electrode side and a negative electrode side of the DC power supply 10. A pulse width modulation method or the like is adopted in which a pulse width of a voltage generated from the inverter 40 is changed by the switching of the total of six switching elements 41 to apply predetermined voltage to the motor 30.

The control device 60 includes a torque limiting unit and a PWM generation unit 63. The torque limiting unit includes a torque limiting factor calculation unit 61 and a post-limitation torque calculation unit 62.

The torque limiting factor calculation unit 61 calculates a torque limiting factor Lmt in the post-limitation torque calculation unit 62 based on a motor temperature value Tm acquired from a motor temperature sensor 50 (hereinafter, the sensor 50) that detects a temperature (motor temperature) of the motor 30.

A specific calculation method of the torque limiting factor Lmt will be described later with reference to FIG. 2.

The post-limitation torque calculation unit 62 multiplies a torque command Trq from a higher-order controller (higher-order control unit) by the torque limiting factor Lmt acquired from the torque limiting factor calculation unit 61, and outputs a post-limitation torque command Trq* to the PWM generation unit 63.

The PWM generation unit 63 generates a PWM drive signal based on the post-limitation torque command Trq* acquired from the post-limitation torque calculation unit 62 such that a torque close to an actual value is output. The generated PWM drive signal is output to the inverter 40.

Figure 2:
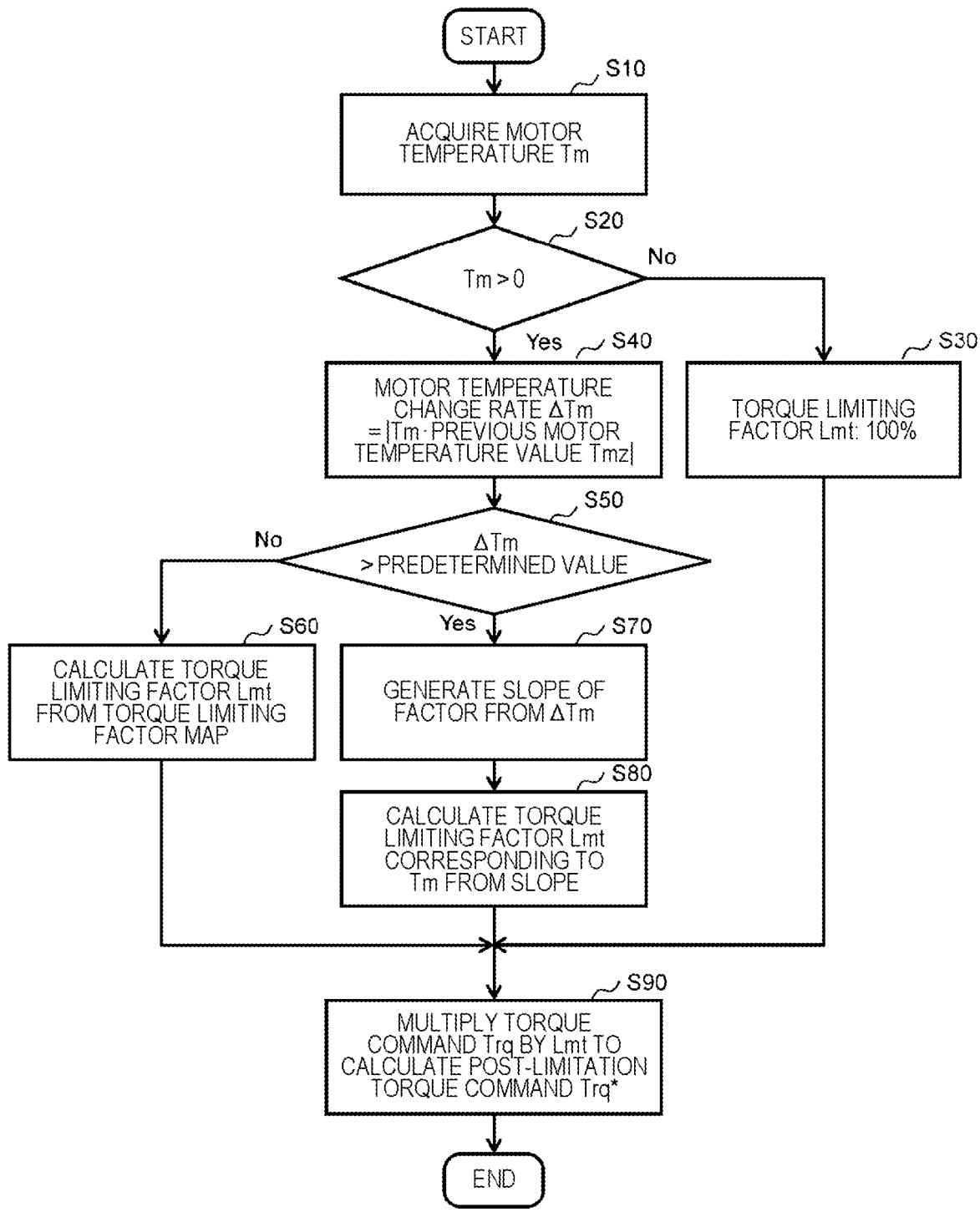
FIG. 2 is a flowchart example of the control device according to the first embodiment of the present invention.
Figure 4:
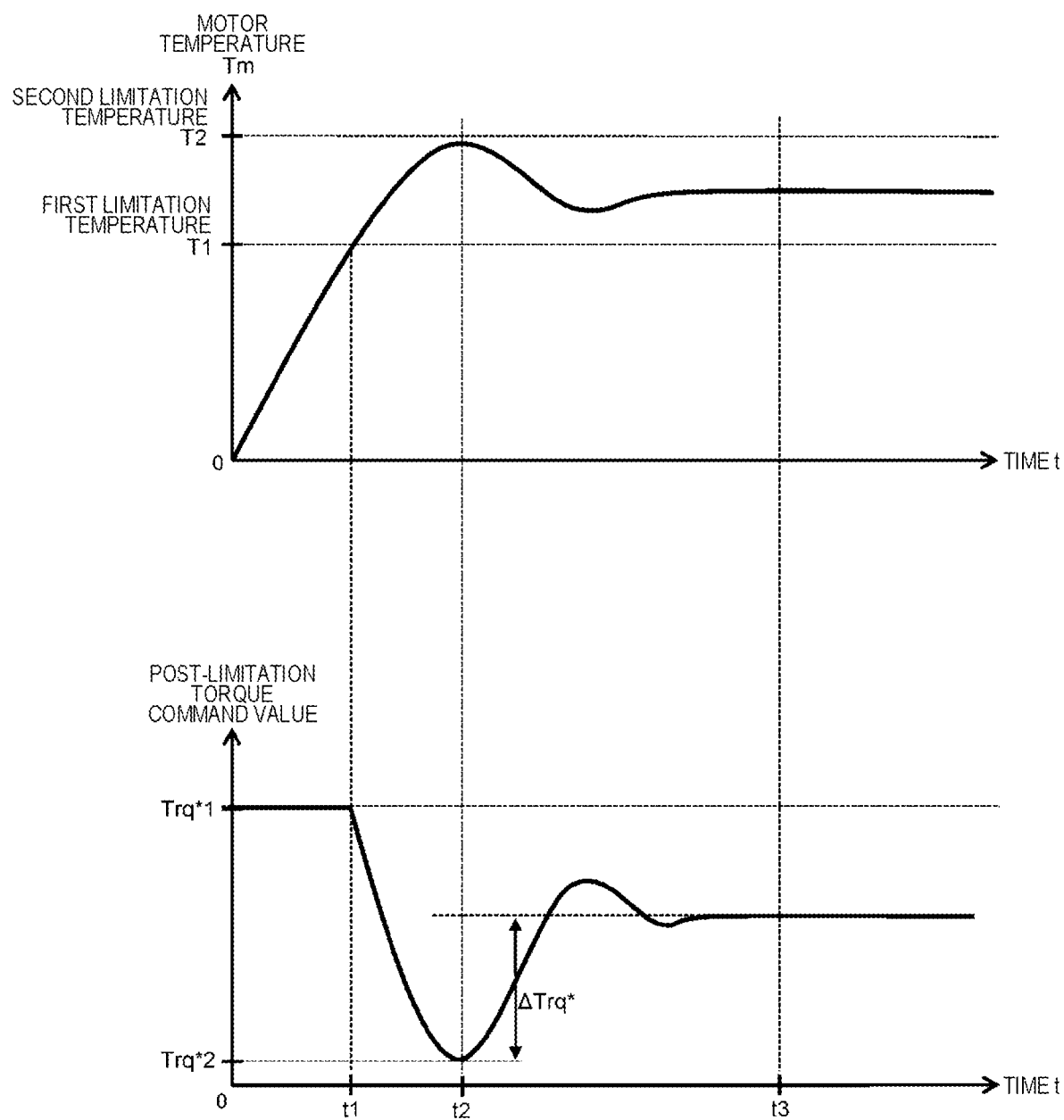
FIG. 4 is a schematic view of torque limitation using a motor temperature of a conventional method.
Figure 5:
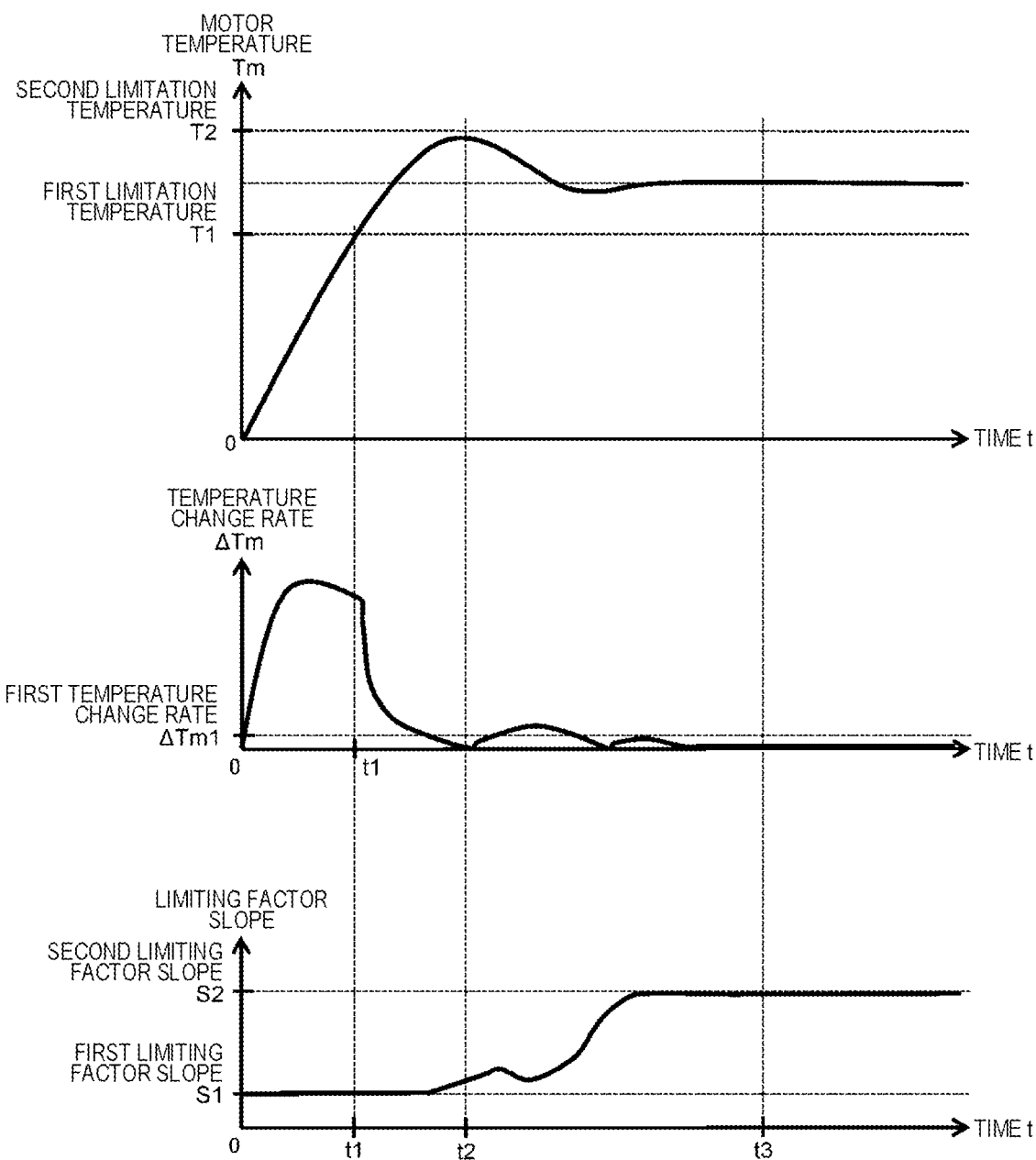
FIG. 5 is a schematic view of torque limitation using a motor temperature according to the first embodiment of the present invention.

FIG. 2 is a flowchart example of the control device 60 according to the first embodiment of the present invention. Note that FIGS. 3 to 5 are used in a detailed description of each step.

In step S10, at the start of torque limitation processing, the torque limiting factor calculation unit 61 acquires the motor temperature value Tm from the sensor 50 that detects the motor temperature.

In step S20, it is determined whether the motor temperature value Tm acquired from step S10 exceeds 0° C. The processing proceeds to step S40 when the motor temperature value Tm exceeds 0° C., and proceeds to step S30 when the motor temperature value Tm is equal to or lower than 0° C.

In step S30, it is determined that the torque limitation is unnecessary, the torque limiting factor is calculated as 100%, and the processing proceeds to step S90.

In step S40, a motor temperature change rate ΔTm is calculated from a deviation between a previous motor temperature value Tmz and the motor temperature value Tm.

In step S50, it is determined whether the motor temperature change rate ΔTm calculated in step S40 exceeds a predetermined value. The processing proceeds to step S70 when the motor temperature change rate ΔTm exceeds the predetermined value, and proceeds to step S60 when the motor temperature change rate ΔTm is equal to or smaller than the predetermined value.

In step S60, the torque limiting factor Lmt is calculated from a torque command factor map of an initial value, and the processing proceeds to step S90.

In step S70, a slope of the torque limiting factor map is newly generated from the motor temperature change rate ΔTm.

FIG. 3 according to step S70 will be described. FIG. 3 is the torque limiting factor map. Note that FIG. 3(a) is a conventional torque limiting factor map, and FIG. 3(b) is the torque limiting factor map of the present invention.

When the motor temperature change rate ΔTm exceeds the predetermined value in step S50, the slope of the torque limiting factor map is changed in a section between motor temperatures T1 and T2, which are certain constant values, as illustrated in FIG. 3(b) based on the motor temperature change rate ΔTm. Specifically, the torque limiting factor map is inclined in the horizontal direction with a torque limiting factor at T3, which is an intermediate temperature between the motor temperatures T1 and T2, as a fulcrum, such that torque limiting values at T1 and T2 become close to each other as ΔTm increases.

In step S80, the torque limiting factor Lmt corresponding to the motor temperature value Tm is calculated from the torque limiting factor map after the slope change calculated in step S70.

In step S90, the post-limitation torque command Trq* is calculated by multiplying the torque limiting factor Lmt calculated in step S30, step S60, or step S80 by the torque command Trq acquired from the higher-order controller, and this flowchart is ended.

As in the above flowchart, when the motor temperature value Tm is higher than a predetermined temperature, the torque limiting unit calculates a torque command limited based on the motor temperature and limits an output torque of the motor.

Next, FIGS. 4 and 5 related to step S90 will be described. FIG. 4 is a view illustrating the content of torque limitation at the time of motor heating in a conventional method, and FIG. 5 is a view illustrating transition of the slope of the torque limiting factor map according to the present invention.

First, the conventional method in FIG. 4 will be described. When a torque command corresponding to Trq*1 is output from the higher-order controller, the motor temperature Tm gradually increases. A torque limiting factor in FIG. 4 starts from a state of 100%, and the torque limitation is started at the time of reaching the motor temperature T1 in FIG. 4.

Although the torque limitation is applied from the first limitation temperature T1 (time t1 on the horizontal axis) in FIG. 4, a reaction of the control device 60 with respect to the motor temperature value Tm is delayed due to a delay in conversion from a current to heat generation or a delay in detection of the motor temperature value Tm. Thus, a phenomenon in which a post-limitation torque temporarily decreases to Trq*2 occurs at time t2 as illustrated in FIG. 4. Thereafter, a point (continuous rated value) at which a limitation torque and the motor temperature value Tm are balanced with a predetermined post-limitation torque value is generated at a time point of t3 in FIG. 4 during hunting so that a graph converges. The continuous rated value changes depending on an operation condition such as a motor rotation speed, an ambient temperature, a state of a cooling device, and the like.

Next, a function of the control device 60 of the present invention will be described with reference to FIG. 5. An upper graph of FIG. 5 is a graph of the motor temperature value Tm, which is similar to FIG. 4. Lower graphs of FIG. 5 are a graph representing a rate of change over time (hereinafter, a temperature change rate ΔTm) of the motor temperature and a graph representing the slope of the torque limiting factor map, respectively, with the time t on the horizontal axis.

A variable proportion of the slope of the torque limiting factor map according to the embodiment of the present invention is determined based on the motor temperature change rate ΔTm. Here, a first temperature change rate is defined as ΔTm1.

Normally, when a torque command of a certain level or more is continuously applied, the temperature change rate ΔTm is in a high state by time t1 at which the torque limitation is started as illustrated in the middle graph of FIG.

5. At this time, the temperature change rate ΔTm is significantly larger than the first temperature change rate ΔTm1, and thus, the slope of the torque limiting factor map is decreased (in the horizontal direction). This corresponds to a change in the slope of the torque limiting factor map in FIG. 3 in the horizontal direction.

As illustrated in the lower graph of FIG. 5, the slope of the torque limiting factor map can be changed within a range of a first slope S1 to a second slope S2 to limit a variable angle. As a result, the slope of the torque limiting factor map is variable within a variable range R of FIG. 3 (b).

At time t1, since the temperature change rate ΔTm is large, the slope of the torque limiting factor map is a lower limit S1. After the limitation start time t1, the torque limitation is started, and the increase of the motor temperature becomes gentle, so that the temperature change rate ΔTm decreases.

At time t2, the temperature change rate ΔTm becomes zero when the motor temperature value Tm reaches the highest point. Thereafter, the motor temperature value Tm turns to drop, and thus, the temperature change rate ΔTm increases again, and the operation is performed in a direction of decreasing the slope of the torque limiting factor map again when the temperature change rate ΔTm exceeds the first temperature change rate ΔTm1.

Thereafter, every time the temperature change rate ΔTm exceeds or falls below the first temperature change rate ΔTm1, the slope of the torque limiting factor map is increased or decreased, the motor temperature value Tm and a torque limiting value are balanced when reaching time t3, and the limitation torque is saturated. In this process, when the temperature change rate ΔTm converges within ΔTm1, the slope of the torque limiting factor map is fixed to S2, that is, becomes a limitation slope of the torque limiting factor map in the initial state.

Note that the slope of the torque limiting factor map in FIG. 5 is obtained by multiplying a deviation between the first temperature change rate ΔTm1 and the motor temperature value Tm by a predetermined gain and adding a temporary delay filter in order to suppress an excessive change in slope.

Thus, in the case where the rate of change in the motor temperature is larger than the predetermined value as described in FIG. 3, the torque limiting unit limits the torque such that the torque changes more gently as compared with a case where the rate of change over time in the motor temperature is equal to or smaller than the predetermined value. Further, the torque limiting amount is made variable by changing the slope of the torque limiting factor map which is a relational expression between the motor temperature and a torque limitation rate. Furthermore, when the rate of change in the motor temperature is large, the slope of the relational expression between the motor temperature and the torque limitation rate can be reduced, and the current flowing through the motor is limited such that the torque gently changes with respect to the change in the motor temperature.

According to the first embodiment of the present invention described above, the following operational effects are achieved.

(1) In the control device 60, the control device 60 includes: the PWM generation unit 63 that outputs the PWM drive signal to the inverter 40; and the torque limiting unit that outputs the post-limitation torque command to the PWM generation unit 63 based on the torque command from the higher-order controller and the motor temperature. The torque limiting unit includes: the torque limiting factor calculation unit 61 that calculates the torque limiting factor based on the motor temperature; and the post-limitation torque calculation unit 62 that outputs the post-limitation torque command to the PWM generation unit 63 based on the torque command from the higher-order control unit and the torque limiting factor output from the torque limiting factor calculation unit 61. The torque limiting factor calculation unit 61 limits the output torque of the motor 30 based on the motor temperature in a case where the motor temperature is higher than a predetermined temperature, and limits a torque to make the torque change more gently in a case where a rate of change over time in the motor temperature is larger than a predetermined value as compared with a case where the rate of change over time in the motor temperature is equal to or smaller than the predetermined value. With this configuration, the output of the motor does not decrease more than necessary, and the motor can be protected.

(2) The torque limiting factor calculation unit 61 of the control device 60 changes the slope of the relational expression between the motor temperature and the torque limitation rate to make the torque limiting amount variable. Thus, the hunting can be suppressed according to the rate of change in the motor temperature.

(3) The torque limiting factor calculation unit 61 of the control device 60 decreases the slope of the relational expression between the motor temperature and the torque limitation rate as the rate of change in the motor temperature increases. With this configuration, the hunting can be suppressed without excessive torque limitation even in a transient state in which the motor temperature starts to increase rapidly.

(4) The torque limiting unit of the control device 60 limits the current flowing through the motor 30 such that the torque gently changes with respect to the change in the motor temperature. In this manner, an output of a vehicle does not change, and performance does not deteriorate.

Second Embodiment

Figure 6:
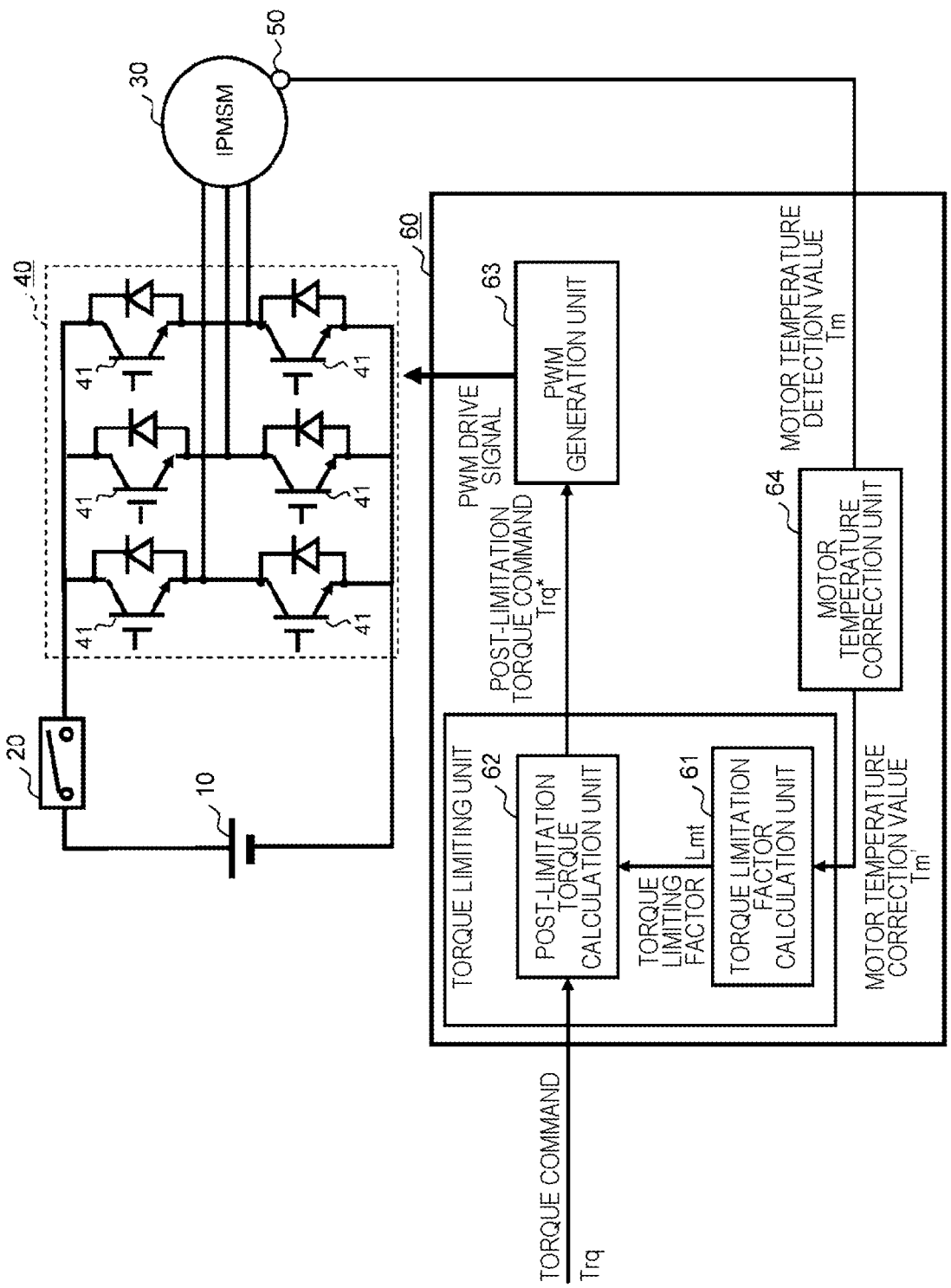
FIG. 6 is a diagram illustrating a configuration of a control device according to a second embodiment of the present invention.

A second embodiment of the present invention will be described with reference to FIG. 6. FIG. 6 is a diagram illustrating a configuration of a control device 60A according to a second embodiment of the present invention.

The control device 60A includes a motor temperature correction unit 64 in addition to the control device 60 described with reference to FIG. 1. In the first embodiment, the motor temperature value Tm is input by the torque limiting factor calculation unit 61, but a motor temperature estimation value TmA obtained by correcting a detection delay or a detection error of the motor temperature value Tm is generated and input by the motor temperature correction unit 64 as illustrated in FIG. 6.

In a case where torque limitation using the torque limiting factor map as illustrated in FIG. 4 described in the first embodiment is performed, a considerable delay component is included even if a motor temperature correction value is input so that torque hunting is likely to occur. Therefore, the torque hunting can be further reduced by applying a configuration in which the motor temperature correction is performed on the temperature detected by the sensor 50 so as to approach an actual motor temperature at a stage before the torque limiting factor calculation unit 61 as illustrated in FIG. 6.

According to the second embodiment of the present invention described above, the following operational effects are achieved.

(5) The motor temperature detected by the control device 60 is a temperature obtained by correcting the temperature detected by the sensor 50 so as to approach the actual motor temperature. With this configuration, the hunting at the time of the torque limitation can be further reduced.

Third Embodiment

Figure 7:
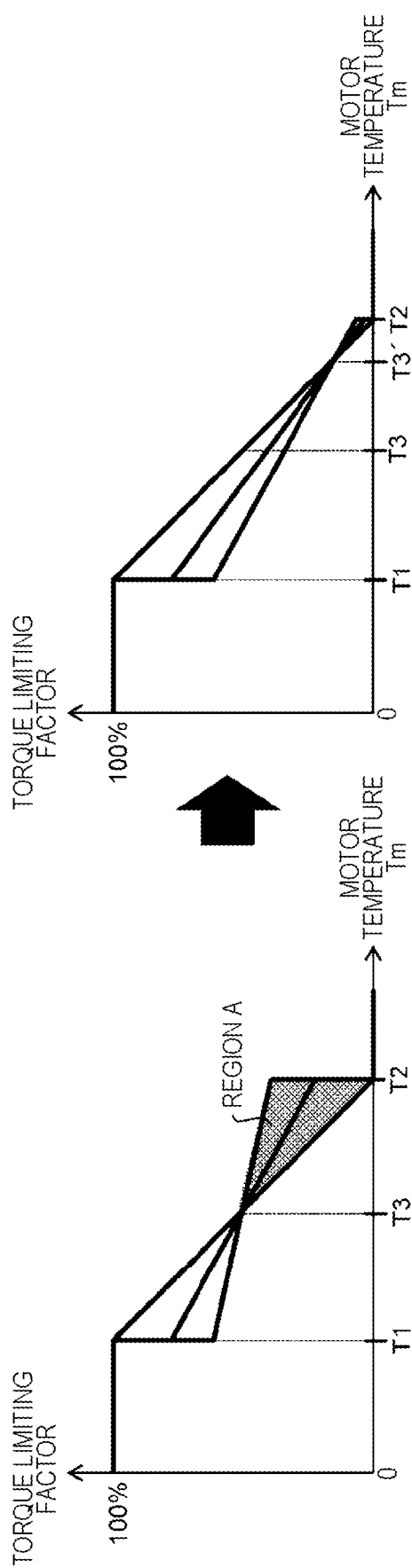
FIG. 7 is a diagram illustrating a torque limiting factor map of a control device according to a third embodiment of the present invention.

A third embodiment of the present invention will be described with reference to FIG. 7. FIG. 7 is a torque limiting factor map of a control device 60B illustrating a third embodiment of the present invention.

In the torque limiting factor map of FIG. 7, an intersection point T3 between T1 and T2 is changed from the torque limiting factor map of FIG. 3, which is the first embodiment, depending on an operation condition, a cooling condition, and the like. That is, a fulcrum for changing a slope of a relational expression between a motor temperature and a torque limitation rate is variable.

An example of FIG. 7 will be described. For example, when an ambient temperature of the control device is high, there is a case where it is assumed that a saturation point of a limitation torque is a point closer to T2 than T3 as illustrated in FIG. 3. In this case, if the slope of the torque limiting factor map is set to the horizontal direction in a state where the motor temperature value Tm is higher than T3, a torque limitation time in a region A of FIG. 7 increases, and thus, there is a possibility that the torque more than expected is temporarily output. Here, the torque hunting can be reduced while suppressing a temperature increase more than expected by setting the intersection point T3 to the point closer to T2 than T1 as in T3B.

According to the third embodiment of the present invention described above, the following operational effects are achieved.

(6) The torque limiting factor calculation unit 61 of the control device 60 varies the fulcrum used at the time of changing the slope of the relational expression between the motor temperature and the torque limitation rate. With this configuration, it is possible to reduce the torque hunting while suppressing a temperature increase more than expected caused by an environmental condition.

As described above, the present invention has been described regarding a case where the above-described embodiments are applied to the system in which the three-phase AC motor is mounted as a load, but the present invention is not limited thereto, and can also be applied to a system including a rotating machine.

Further, a torque limiting function related to the motor temperature of the motor control device has been described in the present invention, but the present invention is also applicable to output limitation at a temperature for other heat-generating sites. For example, in a case where an inverter of a motor drive device includes a temperature detection circuit and the inverter is protected by limiting an output with a detected temperature as an input, a delay occurs in conversion from a current to heat, and thus, there is a possibility that torque hunting can be suppressed by adopting the configuration of the present invention.

The above-described respective embodiments and various modifications are merely examples, and the present invention is not limited to these contents unless the features of the invention are impaired. In addition, the various embodiments and modifications have been described as above, but the present invention is not limited to these contents. Other aspects that can be considered within the scope of the technical ideas of the present invention are also included in the scope of the present invention.

REFERENCE SIGNS LIST

10 DC power supply
20 contactor
30 AC motor
40 inverter
41 switching element
50 motor temperature sensor
60 control device
61 torque limiting factor calculation unit
62 post-limitation torque calculation unit
63 PWM generation unit
64 motor temperature correction unit

The invention claimed is:

1. A control device comprising:
a PWM generation unit that outputs a PWM drive signal to an inverter; and
a torque limiting unit that outputs a post-limitation torque command to the PWM generation unit based on a torque command from a higher-order control unit and a motor temperature, wherein
the torque limiting unit includes
a torque limiting factor calculation unit that calculates a torque limiting factor based on the motor temperature, and
a post-limitation torque calculation unit that outputs the post-limitation torque command to the PWM generation unit based on the torque command from the higher-order control unit and the torque limiting factor output from the torque limiting factor calculation unit, and
the torque limiting factor calculation unit limits an output torque of a motor based on the motor temperature in a case where the motor temperature is higher than a predetermined temperature, and limits a torque to make the torque change more gently in a case where a rate of change over time in the motor temperature is larger than a predetermined value as compared with a case where the rate of change over time in the motor temperature is equal to or smaller than the predetermined value.

2. The control device according to claim 1, wherein the torque limiting factor calculation unit changes a slope of a relational expression between the motor temperature and a torque limitation rate to vary a torque limiting amount of the post-limitation torque command.

3. The control device according to claim 2, wherein the torque limiting factor calculation unit decreases the slope of the relational expression between the motor temperature and the torque limitation rate as a rate of change in the motor temperature increases.

4. The control device according to claim 1, wherein the motor temperature is a temperature obtained by correcting a temperature detected by a sensor to approach an actual motor temperature.

5. The control device according to claim 2, wherein the torque limiting factor calculation unit varies a fulcrum for changing the slope of the relational expression between the motor temperature and the torque limitation rate.

6. The control device according to claim 1, wherein the torque limiting unit limits a current flowing through the motor to make the torque gently change with respect to change in the motor temperature.

\* \* \* \* \*